Fig.2

United States Patent Office 3,493,472
Patented Feb. 3, 1970

3,493,472
PROCESS AND APPARATUS FOR THE PURIFICATION OF FORMALDEHYDE BY RECTIFICATION WITH PLURAL STAGE CONDENSER-ABSORBER ZONES
Rolf Schumacher, Berlin, Germany, assignor to Firma Karl Fischer Apparate-u. Rohrleitungsbau, Berlin, Germany
Filed Nov. 28, 1966, Ser. No. 597,407
Claims priority, application Italy, Dec. 1, 1965, 26,763/65
Int. Cl. B01d 3/10; B01j 1/22; C07c 45/24
U.S. Cl. 203—42                              11 Claims

ABSTRACT OF THE DISCLOSURE

A process and device for the production of formaldehyde solutions having a concentration in excess of 67 and as high as 96 weight percent formaldehyde, in a single step and without further refining, from gases containing formaldehyde and methanol, with simultaneous increase in yield.

FIELD AND SUMMARY OF THE INVENTION

The new process according to the invention obtains a considerable increase in yield by means of a novel device and by averting the loss of methanol. In previously known processes, such loss had been considered inevitable.

An important feature of the process according to the invention is that the hot formaldehyde-containing gases intended for processing can be produced by any known process, for example, by the partial dehydrogenation and oxidation of methanol in the presence of silver as catalyst with an excess of air or by the oxidation of methanol in the presence of oxidic catalysts with an excess of air. A catalytic reaction of this type yields a mixture of vapors of formaldehyde, methanol and water (reaction water), as well as hydrogen, carbon dioxide, carbon monoxide, nitrogen and traces of methane and oxygen.

Thus, a process for the production of highly concentrated formaldehyde solutions is provided wherein hot, formaldehyde- and methanol-containing gases are fed into a rectifying column at a point about halfway up the rectifier column, which is operated under vacuum and additionally heated; the emergent vapors passed to a condensation and absorption apparatus, which also is operated under vacuum; part of the liquid runoff returned to the head of the rectifying column as reflux; and a highly concentrated formaldehyde solution is drawn off from the base of the rectifier column.

As an example for the composition of the catalytic gas mixture used in both devices as shown herein, a gas was used which had been obtained by partial dehydrogenation and oxidation of methanol in the presence of silver as catalyst and with a deficiency of air, according to a process known per se. As an alternate, gas from another known process may be employed which is produced by the oxidation of methanol in the presence of oxide (oxygenous) catalysts with an excess of air. The latter generally contains less methanol and more reaction steam than the former.

In a modification of the instant process, two rectifying columns are used, equivalent to the upper and lower halves of the rectifying column mentioned above. In the case of this embodiment, the hot, formaldehyde-containing gases are fed into the base of a first rectifying column which is operated under vacuum, to the head of which part of the liquid runoff from the condensation and absorption apparatus is returned as reflux, the liquid runoff from said first rectifying column being supplied to the head of a second rectifying column which is additionally heated and operated at substantially atmospheric pressure, from the base of which is obtained the highly concentrated formaldehyde solution while the head product of said second rectifying column is fed to the base of the first rectifying column.

The invention also relates to an apparatus for carrying out the new process, which comprises a rectifier to which a condensation and absorption device is connected, said device comprising two serially connected columns, the head of the first column being connected via a vacuum pump to the base of the second column, means being provided whereby the head product of the rectifier is fed to the base of the first said column and whereby part of the liquid runoff from the first said column is returned to the head of the rectifier as reflux.

In one embodiment, the rectifier comprises a single column with an inlet about halfway up the column for the admission of the hot, formaldehyde-containing gases, means being provided at the head of the column to conduct vapors to the condensation and absorption device and an outlet being installed at the base of the column for the removal of the formaldehyde solution.

In another embodiment, the rectifier comprises two serially connected columns in which the inlet for the hot, formaldehyde-containing gases is provided at the base of one of said columns, the head of this column being connected to the condensation and absorption device, and in which the base of this column is connected via a suction pump to the head of the second column, means also being provided for conveying the head product of this second column, via pressure regulating means, to the base of the first column, the base of the second column being equipped with an outlet for the removal of the formaldehyde solution.

BRIEF DESCRIPTION OF THE DRAWINGS

For the purpose of better understanding of the present invention, reference is made to the accompanying drawings which are schematics and wherein FIG. 2 illustrates a rectifier with two columns and attendant devices.

Figure 1:
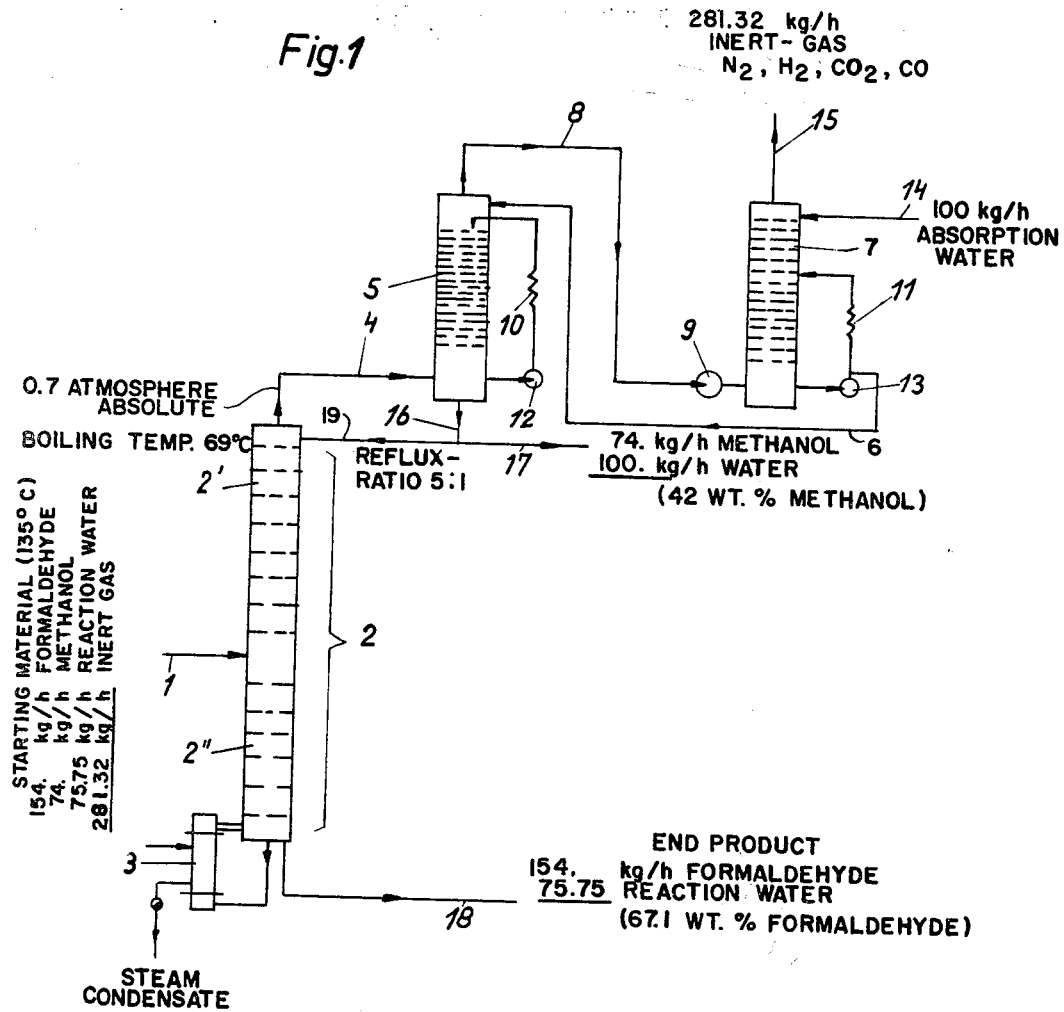
FIG. 1 illustrates a single-column rectifier with accessories according to the invention for carrying out the new process.

It should be noted that, as used in this specification, accompanying figures and claims, the terms "Ca," "torr" and "condenser and absorber" are defined as follows:

"Ca" means "approximately."

"Torr" is a unit of pressure, particularly air pressure or vacuum. 1 torr is the pressure exerted by a 1 mm. column of mercury, said pressure being equal to 1.36 g. per square centimeter. One atmosphere is equivalent to 760 torr.

"Condenser and absorber" refers to a single unit acting as both condenser and absorber.

DESCRIPTION OF THE PREFERRED EMBODIMENTS

In the apparatus according to FIG. 1, a hot, formaldehyde-containing gas mixture is passed through pipe 1 to a point about halfway up the column of rectifier 2, said rectifier 2 thus comprising an upper part 2' and a lower part 2". Since, for heating the column, the heat of the reaction gas itself does not suffice, the sump of the column 2 is provided with heating means 3 for the supply of additional heat.

The mixture of various gases and vapors resulting from the rectification process (briefly referred to as vapor) is passed from the head of the upper part 2' of rectifier column 2, via a vapor pipe 4, to the base of a first condensation and absorption apparatus 5 of known construction and therein sprayed, as it ascends, with a condensate supplied via a condensate return pipe 6 to the head of the first column 5. This condensate is derived from a second condensation and absorption device 7, into the base of which there is fed, by means of a vacuum pump 9, the vapor drawn off from the head of the first column 5 via the vapor pipe 8.

For the cooling of the two columns 5 and 7, there is attached to each of them a known type of heat exchanger 10 and 11, respectively, each having a circulation pump 12 and 13, respectively.

The required amount of absorption water, i.e., substantially 100 kg., is fed into the head of the second column 7 by way of conduit 14, and the largely elutriated inert gas mixture is released into the atmosphere through pipe 15. It contains $N_2$, $H_2$, CO and $CO_2$.

The total amount of the condensate from the base of the first condensation-absorption device 5, consisting substantially of water (water of reaction and absorption water) and unconverted methanol, is run off through a pipe 16 and divided in a reflux ratio depending upon the operation of the plant. One part, approximately ⅕, is withdrawn through pipe 17 and can be refined in a known manner in a small methanol recovery apparatus. A typical composition of this portion is 74 kg./h. methanol, 100 kg. water, i.e., a methanol content of 42 weight percent. The other part is again fed, via condensate return pipe 19, to the head of rectifier 2. At the base of the latter, a highly concentrated formaldehyde solution, containing more than 65% by weight of formaldehyde, is drawn off through pipe 18.

This high concentration essentially is attained by two measures, namely:

(a) The rectification at a vacuum in a range of 100 to 600 mm. Hg; and (b) The gas mixture is fed in halfway up the rectifier column, while in the lower, additionally heated column part 2″, a considerable amount of water can still be driven off.

The above-described new process also achieves a considerable improvement in the yield. For the condensation of the vapors withdrawn from the rectifier column 2, a surface condenser is not used since the gases cooled in such an apparatus would still contain too much methanol at economical temperatures. In the described means 5 to 16, not only are the vapors condensed but they are also washed out with water to such an extent that only very small amounts of methanol are lost by escaping through the exhaust pipe 15.

By way of modification, it is also possible to use only one condensation-absorption column of correspondingly larger dimensions, with a vacuum pump provided at its head. However, with regard to the improved yield, it is more advantageous to carry out the remaining condensation and absorption and the supplying of the absorption water subsequent to the vacuum pump, i.e. at atmospheric pressure.

Figure 2:
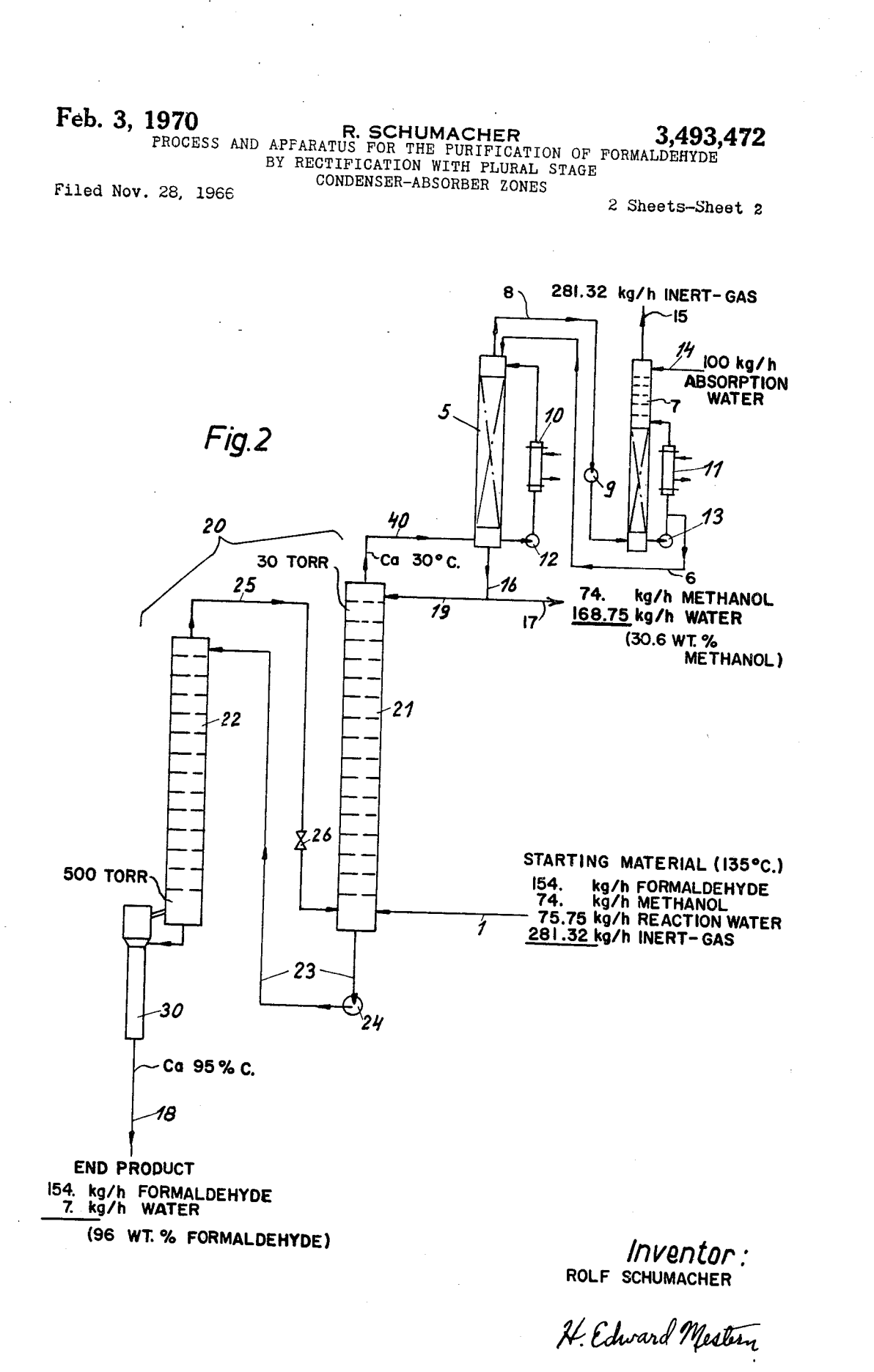

FIG. 2, illustrating the second constructional embodiment, contains, where appropriate, the same reference numerals for certain parts of the plant as in FIG. 1. The principal difference is that the rectifier device 20 consists of two series-connected columns 21 and 22. The inlet pipe 1 is at the base of the first column 21 and a pipe 40 for leading off the rectifier vapors is provided at its head. The head of the additionally heated second column 22 is connected with the base of the first column 21 in such a manner that the pipe 23, conveying the sump product of the first column, a suction pump 24 is inserted, and in the pipe 25, conveying the head product of the second column 22, a pressure regulating means 26 is installed.

In construction, the rectification device 20 thus works with a definite pressure difference, which can be adjusted at will. In the second rectifier column 22, providing the highly concentrated end product, essentially atmospheric pressure prevails or only slightly reduced pressure, whereas the first rectifier column 21 is operated under a reduced pressure produced by the vacuum pump 9. This modus operandi enables the production of a highly concentrated end product. In this regard, it is also advantageous to employ a known type of falling film evaporator 30, instead of the heating means 3 indicated in FIG. 1.

The composition of the starting and end products and other pertinent data are given in FIG. 2 of the drawings.

I claim as my invention:

1. A multiple stage reflux process for the production of aqueous formaldehyde solution having a formaldehyde concentration of up to 96 weight percent, from starting gases containing formaldehyde, methanol and inert gases, said starting gases being derived from the catalytic oxidation of methanol, which method comprises the steps of feeding said starting gases into an intermediate part of a rectifying zone, said zone having a head part and being under vacuum and externally supplied with heat, to form emergent vapors;

conducting said emergent vapors directly to a first stage having a head part and a bottom part, said first stage further being under vacuum;

condensing a part of said emergent vapors in said first stage;

conducting an uncondensed remainder of said emergent vapors to a second stage containing absorption water, said second stage having a head part and a bottom part, said second stage further being under vacuum, said uncondensed remainder of said emergent vapors being conducted to the bottom part of said second stage to contact said absorption water whereby said uncondensed remainder of said emergent vapors is condensed, a portion of said methanol is absorbed in said absorption water, and said inert gases are released from the head of said second stage;

recycling the condensate formed in said second stage from the bottom of said second stage to the head of said first stage;

absorbing in said first stage said condensed part of said emergent vapors in said recycled condensate of said second stage;

returning part of the absorbed condensed part of said emergent vapors from the bottom of said first stage to the head of said rectifying zone as a reflux, whereby a highly concentrated formaldehyde solution is formed in said rectifying zone; said highly concentrated formaldehyde solution being withdrawn from the bottom thereof.

2. The process as defined in claim 1, wherein said rectifying zone is a single zone; the starting gases are fed into substantially the center thereof; and said heat is supplied to the lower part thereof.

3. The process as defined in claim 1, wherein said rectifying zone comprises a first zone and a second zone, each of said zones having a bottoms stream; said first and said second zones also being connected in series; said starting gases being fed into the base of said first zone; part of the bottoms stream of said first and said second stages being returned to the head of said first zone as reflux; the bottoms stream from said first zone being supplied to said second zone, said second zone being externally heated and substantially at atmospheric pressure; said highly concentrated formaldehyde solution being withdrawn from the base of said second zone; and the bottoms stream from said second zone being fed from the head of said second zone into the base of said first zone.

4. The process as defined in claim 1, wherein the vacuum applied ranges from 100 to 600 mm. Hg.

5. A device for the production of aqueous formaldehyde solution having a formaldehyde concentration of up to 96% by weight, from starting gases containing formaldehyde, methanol and inert gases, said starting gases being derived from the catalytic oxidation of methanol, which comprises a rectifying column having an inlet; feed means for introducing said starting gases into said inlet; a first condenser-absorber connected directly to the head of said column, said first condenser-absorber having a run-off; a second condenser-absorber connected to said first condenser-absorber, said second condenser-absorber also having a bottoms stream; means for refluxing part of the condensate of said second condenser-absorber to said first condenser-absorber; outlet means at the top of said second condenser-absorber for releasing said inert gases; means for supplying absorption water to the head of said second condenser-absorber; discharge means for said formaldehyde solution at the bottom of said column; means for heating part of said column; and vacuum means for said column, said first condenser-absorber, and said second condenser-absorber.

6. The device as defined in claim 5, wherein said column is a single column; the starting gases being fed substantially into the center thereof; and inlet means therefor; said heating means heating the lower part of said column.

7. The device as defined in claim 5, wherein said rectifying column comprises a first column part, said first column part having a bottoms stream, and a second column part, said second column part also having a bottoms stream; said inlet being located at the bottom of said first column part; further including means for returning a portion of the run-off of said first condenser-absorber and said second condenser-absorber to the head of said first column part; and means for cycling the bottoms stream of said first column part to said second column part; said means for heating being used to heat said second column part; said discharge means being used to withdraw said formaldehyde solution from the base of said second column part; and means for recycling the bottoms stream of said second column part from the head of said second column part to the base of said first column part.

8. The device as defined in claim 5, wherein said vacuum means supply a pressure ranging from 100 to 600 mm. of Hg.

9. A process for the production of aqueous formaldesolution having a formaldehyde concentration of up to 96% by weight from starting gases containing formaldehyde, methanol and inert gases, said starting gases being derived from the catalytic oxidation of methanol, which comprises feeding said starting gases into a rectifying column, said rectifying column being under vacuum and supplied with external heat, to form emergent vapors; passing said vapors directly into a first condenser-absorber, then into a second condenser-absorber, said first condenser and absorber and said second condenser-absorber each being under vacuum and each having a bottoms stream, said second condenser-absorber also having absorption water fed therein; recycling part of the bottoms stream of said second condenser-absorber into said first condenser-absorber; releasing said inert gases from said second condenser-absorber into the atmosphere; returning part of the bottoms stream of said first condenser-absorber and said second condenser-absorber to the head of said column; and withdrawing from the base of said column a highly concentrated formaldehyde solution.

10. The process as defined in claim 9, wherein said rectifying column is a single column; the starting gases being fed substantially into the center thereof; and said external heat is supplied to the lower part thereof.

11. The process as defined in claim 9 wherein said rectifying column comprises a first part and a second part, each of said parts having a bottoms stream; said first and said second parts being serially interconnected; said starting gases being fed into the base of said first part; a portion of the bottoms stream of said first condenser-absorber and said second condenser-absorber being returned to the head of said first part as reflux; the bottoms stream from said first part being supplied to said second part; said second part being heated and substantially under atmospheric pressure; said concentrated formaldehyde solution being withdrawn from the base of said second part; and the bottoms stream from said second part being cycled from the head of said second part into the base of said first part.

References Cited

UNITED STATES PATENTS

| | | | |
|---|---|---|---|
| 2,070,864 | 2/1937 | Ragatz | 203—78 |
| 2,241,110 | 5/1941 | Bogart et al. | 203—78 |
| 2,527,655 | 10/1950 | Pyle et al. | 203—17 |
| 2,676,143 | 4/1954 | Lee et al. | 203—17 |
| 2,790,755 | 4/1957 | Walker | 203—17 |
| 3,113,972 | 12/1963 | Kodama et al. | 260—606 |
| 3,296,309 | 1/1967 | De Rooÿ | 260—606 |

FOREIGN PATENTS

| | | |
|---|---|---|
| 851,182 | 9/1939 | France. |
| 53,112 | 11/1944 | France. |
| | | (Addition to No. 887,471) |

WILBUR L. BASCOMB, Jr., Primary Examiner

U.S. Cl. X.R.

202—154, 161, 183, 186; 203—17, 78, 80, 87; 260—606